United States Patent
Carels (10) Patent No.: US 11,971,078 B2
(45) Date of Patent: Apr. 30, 2024

(54) LAYERED SUPPORT

(71) Applicant: CDM NV, Overijse (BE)

(72) Inventor: Patrick Carels, Overijse (BE)

(73) Assignee: CDM STRAVITEC NV, Overijse (BE)

( * ) Notice: Subject to any disclaimer, the term of this patent is extended or adjusted under 35 U.S.C. 154(b) by 359 days.

(21) Appl. No.: 16/469,006

(22) PCT Filed: Dec. 13, 2017

(86) PCT No.: PCT/IB2017/057874
§ 371 (c)(1),
(2) Date: Jun. 12, 2019

(87) PCT Pub. No.: WO2018/109680
PCT Pub. Date: Jun. 21, 2018

(65) Prior Publication Data
US 2019/0316646 A1     Oct. 17, 2019

(30) Foreign Application Priority Data
Dec. 13, 2016   (BE) .................................. 2016/5923

(51) Int. Cl.
*F16F 1/40*        (2006.01)
*B32B 3/26*        (2006.01)
(Continued)

(52) U.S. Cl.
CPC ............. *F16F 1/40* (2013.01); *B32B 3/263* (2013.01); *B32B 15/06* (2013.01); *B32B 15/18* (2013.01);
(Continued)

(58) Field of Classification Search
CPC ..... B32B 15/06; B32B 15/18; B32B 2307/56; B32B 3/263; E04H 9/022; E04H 9/0215; F16F 1/40; F16F 15/08; E01D 19/041
See application file for complete search history.

(56) References Cited

U.S. PATENT DOCUMENTS 4,830,927 A * 5/1989 Fukahori ................. B32B 25/04
                                                 428/521
5,460,357 A * 10/1995 Stewart ................. F16F 3/0876
                                                 267/141.1
(Continued)

FOREIGN PATENT DOCUMENTS

EP          0058970 A2     9/1982
JP          10227151 A     8/1998

*Primary Examiner* — Maria V Ewald
*Assistant Examiner* — Daniel P Dillon
(74) *Attorney, Agent, or Firm* — Browdy and Neimark, PLLC (57) ABSTRACT

Layered support alternately comprising elastomeric layers and reinforcing layers, wherein an elastomeric layer comprises an elastically compressible elastomeric block (1) with a top surface (2), a bottom surface (3) and a bulging surface (4), wherein the bulging surface (4) bulges out elastically when the elastomeric block (1) is compressed between its top surface (2) and its bottom surface (3) such that the height (A) of the elastomeric block (1) amounts to a compressed height (B), wherein a first reinforcing layer comprises a rigid top plate (6) which abuts against the top surface (2) of the elastomeric block (1) and a second reinforcing layer comprises a rigid bottom plate (7) which abuts against the bottom surface (3) of the elastomeric block (1), wherein the top plate (6) and/or the bottom plate (7) are/is provided with a raised edge (5) extending at least partly opposite the bulging surface (4), wherein the bulging surface (4) bulges out elastically and abuts against this raised edge (5) when the elastomeric block (1) is compressed between the top surface (2) and the bottom surface (3) and the height (A) is decreased to a minimum height (D).

20 Claims, 4 Drawing Sheets (51) Int. Cl.
*B32B 15/06* (2006.01)
*B32B 15/18* (2006.01)
*E01D 19/04* (2006.01)
*E04H 9/02* (2006.01)
*F16F 15/08* (2006.01)

(52) U.S. Cl.
CPC ......... *E01D 19/041* (2013.01); *E04H 9/0215* (2020.05); *E04H 9/022* (2013.01); *F16F 15/08* (2013.01); *B32B 2250/05* (2013.01); *B32B 2307/51* (2013.01); *B32B 2307/56* (2013.01); *F16F 2224/02* (2013.01); *F16F 2226/04* (2013.01); *F16F 2226/042* (2013.01)

(56) References Cited

U.S. PATENT DOCUMENTS

| | | | | |
|---|---|---|---|---|
| 2005/0205749 A1* | 9/2005 | Campbell | ............... | A47B 91/04 |
| | | | | 248/633 |
| 2012/0001373 A1* | 1/2012 | McLaughlin | ........... | F16F 1/403 |
| | | | | 267/141.1 |

* cited by examiner

LAYERED SUPPORT

The invention concerns a layered support which alternately comprises one or several elastomeric layers and one or several reinforcing layers, wherein at least one elastomeric layer comprises an elastically compressible elastomeric block with a top surface and a bottom surface situated opposite each other and which are preferably substantially parallel to each other, with a height which amounts to the distance between the bottom surface and the top surface, and with a bulging surface between the top surface and the bottom surface.

When this elastomeric block is elastically compressed between its top surface and its bottom surface, the height of the elastomeric block lowers to a compressed height and the bulging surface bulges out elastically.

Further, a top plate which abuts against the top surface of the elastomeric block comprises at least a first reinforcing layer, and a bottom plate which abuts against the bottom surface of the elastomeric block comprises at least a second reinforcing layer.

Such layered elastic supports with reinforcements, or also armoured elastomers, may for example be used in case of very high loads for decoupling bridges or foundations from buildings and building cores. These building structures are decoupled from the subsurface to avoid any transmission of vibrations from the environment. This increases the comfort in a building and also reduces the risk of damage due to unwanted vibrations. The decoupling is achieved by making the building structures rest on the elastic vibration dampers. The elastomeric blocks may consist of polyurethane elastomers, natural rubber, neoprene rubber or other elastomers which are well known for these applications by those skilled in the art. The reinforcing layers may for example consist of rigid plates which are preferably made of metal, steel, cast iron or possibly also glass fibre-reinforced polymers.

Thus, the elastomeric blocks are elastomeric dampers which can be elastically compressed or also stressed by pressing them together. By the elastic compression of an elastomer is meant herein the elastic deformation of the elastomer by exerting a pressure force whereby the elastomer bulges out and/or also whereby the volume of the elastomer is reduced. Thus, when the elastomeric block is compressed between the top surface and the bottom surface, it will expand laterally in a free space and thus exhibit a bulge. Thus, the top surface and the bottom surface are hereby loaded surfaces of the elastomeric block, whereas the bulging surface is an unloaded surface.

The invention also concerns a method for manufacturing such a layered support.

According to the present state of the art, rubber elastic supports which serve for high loads caused by the building structures resting thereon, are provided with internal reinforcements. These reinforcements may be formed of rigid metal plates to which the rubber is bonded by vulcanisation. Thus is obtained a layered structure wherein the different metal plates extend horizontally, with a rubber layer between said plates. These layered elastic supports are designed to bear relatively high loads at right angles to the different layers.

A disadvantage of these layered supports is that they are quite complex to manufacture and that, in general, the thickness of the rubber layers is restricted. Also, the surface of this support must be quite large in order to allow the building structure resting on it to exert a relatively high load on it.

Simpler layered elastic supports are obtained by placing or gluing elastomeric blocks such as rubber blocks between metal plates. Thereby is obtained a layered support wherein the metal plates protrude beyond the elastomeric blocks.

By means of these reinforcement plates or armature can be obtained an armoured layered elastomer support of several elastomeric layers high, whereas its shape factor corresponds to the shape factor of merely one elastomeric layer.

In such elastic supports which are continuously under a heavy load, so-called creep occurs after some time, whereby the elastomeric block is plastically deformed and compressed, so that the height of the block decreases without the load on the block being increased thereby, for example. This is in particular also the case when, for example, the height of the elastic layers is selected higher so as to reduce the surface of the elastic support.

The invention aims to remedy this by proposing a layered elastic support wherein so-called creep due to a continuously high load is limited, so that, for example, an undesired too large vertical deflection due to this continuous load is limited. Further, the invention also proposes a method for manufacturing such a support wherein the above-mentioned disadvantages are remedied.

To this aim, the invention proposes a layered support wherein at least the top plate and/or the bottom plate are/is provided with a raised edge with a surface extending opposite the bulging surface, as claimed in the appended claims.

Thus, the raised edge extends beyond the bulging surface, preferably up to an edge height which is smaller than the height of the elastomeric block. When the elastomeric block is compressed between the top surface and the bottom surface, and the height is lowered to a minimum height, the bulging surface will elastically bulge out and will at least partially abut against this surface.

Practically, the raised edge has a concavely curved surface which extends opposite the bulging surface, wherein the bulging surface elastically bulges out and abuts against said concavely curved surface when the elastomeric block is compressed between the top surface and the bottom surface and when the height of the elastomeric block is a minimum height.

Advantageously, the curvature of the curved surface of the raised edge is substantially equal to the curvature of the bulging surface of the elastomeric block when the latter is compressed to a minimum height between the top surface and the bottom surface with a given authorised deviation for a load exerted on the elastomeric block while the bulging surface can freely bulge out.

Advantageously, the curvature of the curved surface of the raised edge is moreover substantially larger than the curvature of the bulging surface of the elastomeric block when this elastomeric block is compressed to a minimum height between the top surface and the bottom surface while exceeding a given authorised deviation for a load exerted on the elastomeric block while the bulging surface can freely bulge out.

The invention also concerns a method for manufacturing such a layered elastic support with reinforcement plates and raised edges with a concavely curved surface.

The invention further also concerns a method for restricting the compression of an elastomeric support containing at least one elastomeric block, in particular by restricting the elastic compression of this elastomeric block by making a bulging surface thereof rest against a raised edge when a given elastic compression of the elastomeric block is exceeded.

Other particularities and advantages of the invention will become clear from the following description of practical embodiments of the method and device according to the invention; this description is given as an example only and does not limit the scope of the claimed protection; the reference numbers used below refer to the accompanying figures.

In the different figures, the same reference numbers refer to identical or analogous elements.

The invention generally concerns a layered or armoured elastomeric support composed of alternating elastic layers and rigid reinforcement layers.

The support serves to be loaded at right angles to the different layers. The load may consist for example of an upper structure or building structure. As a consequence, the different layers preferably extend horizontally. The support ensures a decoupling between a subsurface and the structure or building structure above, thus preventing or limiting the transmission of vibrations.

The elastic layers are formed of elastomeric, preferably massive blocks. These elastomeric blocks can be manufactured for example of rubber or other suitable elastomers known to anyone skilled in the art. The rigid layers are formed of reinforcement plates which can be made of steel, for example, or other known suitable relatively rigid materials known to persons skilled in the art. The reinforcement plates provide for a reinforcement of the support's elastic layers. Thus, in case of a certain load and/or a certain compression of the elastomeric blocks, they will prevent the loaded bearing surfaces from being deformed and also the non-loaded bulging surface from being supported.

According to a first embodiment, the layered support consists of three elastic layers with two rigid reinforcing layers in between as represented in FIGS. 1 to 6.

The elastomeric layers each consist of a beam-shaped elastomeric block 1, 1', 1". These elastomeric blocks 1, 1', 1" are elastically compressible and each have a top surface 2 and a bottom surface 3 situated opposite each other and which are preferably substantially parallel to one another. Between their top surface 2, 2', 2" and their bottom surface 3, 3', 3", these blocks each have a bulging surface 4, 4', 4". In this embodiment, the bulging surface 4, 4', 4" has four side surfaces between the top surface 2, 2', 2" and the bottom surface 3, 3', 3" of the beam-shaped elastomeric block 1, 1', 1".

Figure 1:
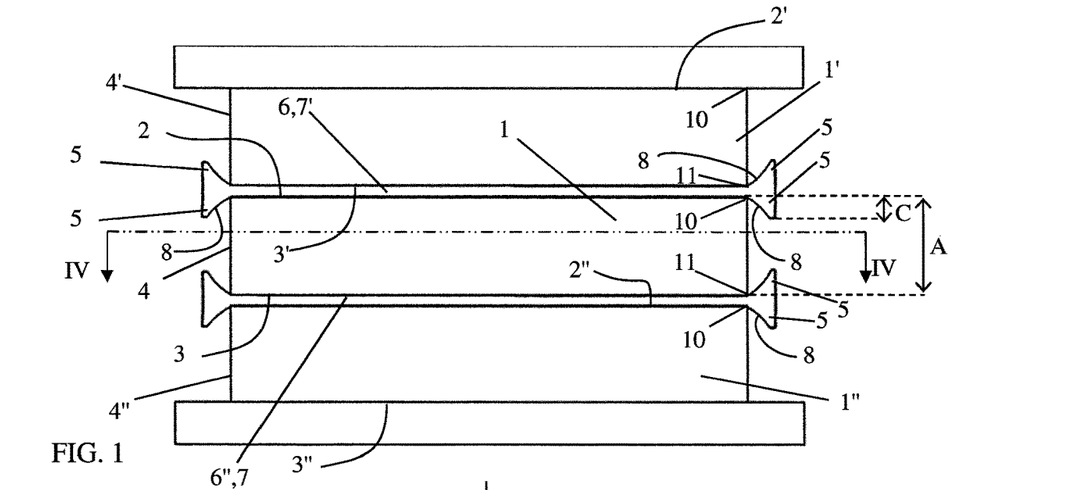
FIG. 1 is a schematic representation of a longitudinal cross-section of a layered support with three elastomeric blocks according to a first embodiment.
Figure 4:
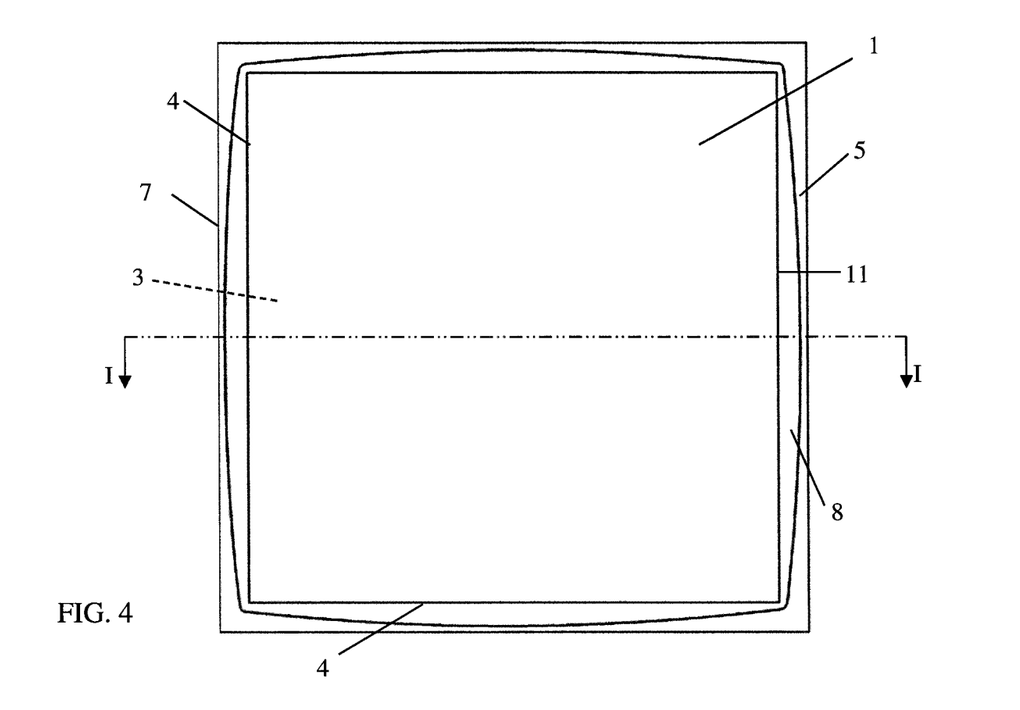
FIG. 4 is a schematic representation of a cross-section of the embodiment of FIG. 1.

In an unloaded state, the bulging surface 4, 4', 4" is preferably entirely flat, and this bulging surface 4, 4', 4" is preferably also perpendicular to the top surface 2, 2', 2" and the bottom surface 3, 3', 3".

The height A of the elastomeric blocks 1, 1', 1" amounts to the distance between the top surface 2, 2', 2" and the bottom surface 3, 3', 3".

A load 9 on the elastomeric blocks 1, 1', 1" may for example be formed by a structure resting on the layered support, not represented in the figures, which consequently rests on the top and bottom surfaces 2, 2', 2", 3, 3', 3" of the elastomeric blocks 1, 1', 1", such that they form loaded bearing surfaces, whereas the bulging surfaces 4, 4', 4" form unloaded surfaces which can elastically bulge out.

Figure 2:
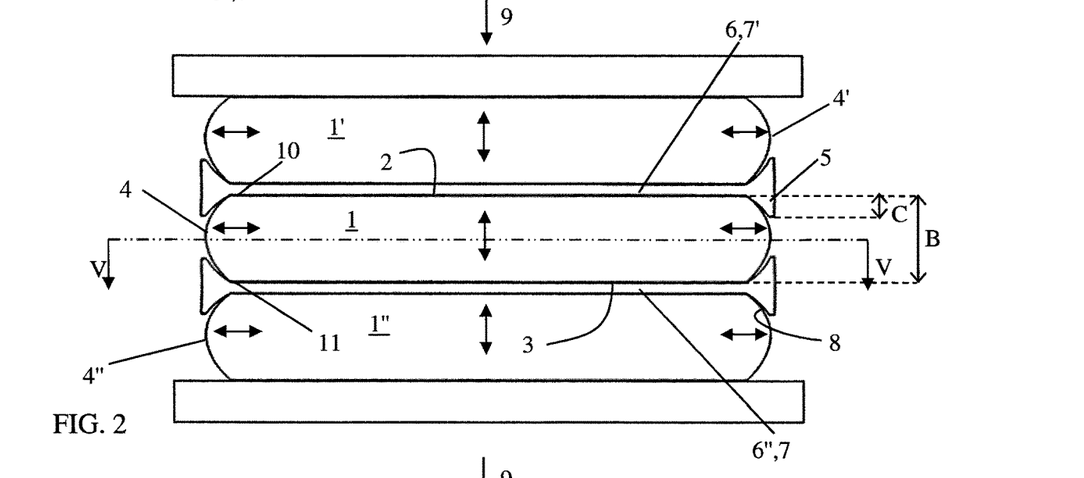
FIG. 2 is a schematic representation as in FIG. 1, wherein the elastomeric blocks of the support are partially compressed.
Figure 5:
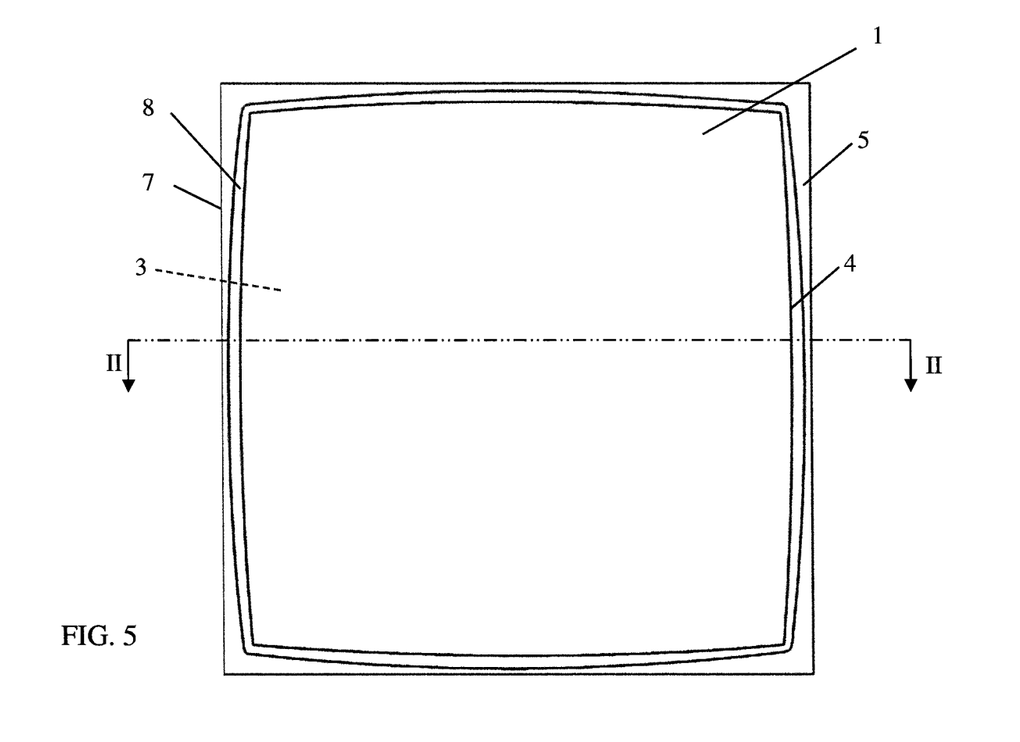
FIG. 5 is a schematic representation of a cross-section of the embodiment of FIG. 2.

By applying the load 9 on the elastomeric blocks 1, 1', 1", these blocks are elastically compressed between their top surfaces 2, 2', 2" and their bottom surfaces 3, 3', 3". The height of the elastomeric blocks 1, 1', 1" thereby decreases to a compressed height B, and the bulging surfaces 4, 4', 4" bulge out elastically. As a result, the bulging surfaces 4, 4', 4" obtain a convex surface.

The three elastomeric blocks 1, 1', 1" are preferably identical to each other, as in this first embodiment. Consequently, when the layered support is loaded, the elastomeric blocks 1, 1', 1" will each undergo an analogous, equal compression.

Figure 7:
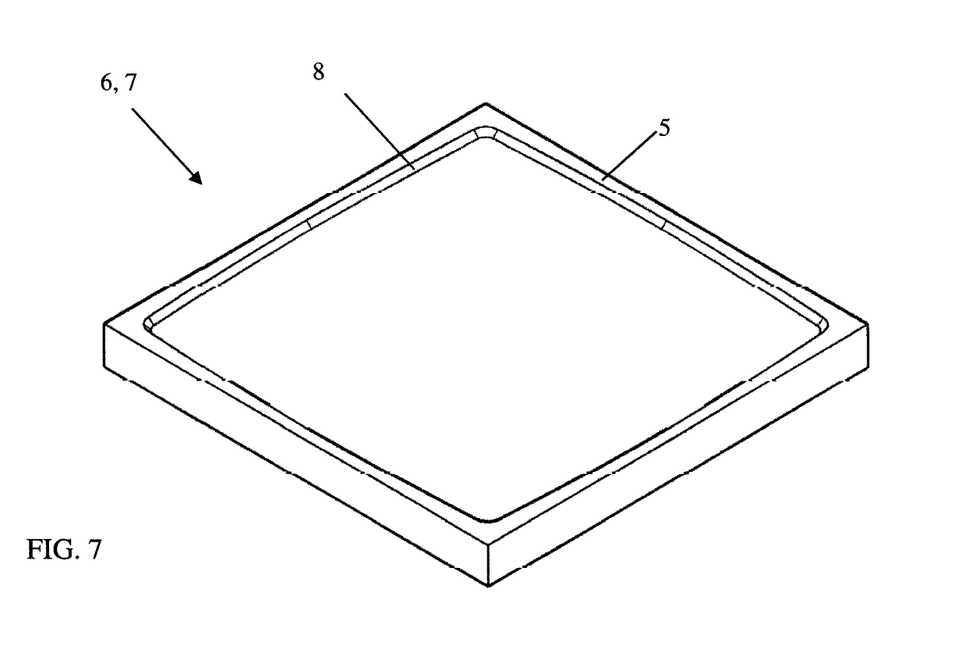
FIG. 7 is a schematic representation of a reinforcement plate from FIG. 1 seen in perspective.

The elastomeric blocks 1, 1', 1" are provided with reinforcing layers containing rigid steel plates 6 and 7, as represented in FIG. 7. Thus, the elastomeric blocks 1, 1', 1" are separated from one another by these steel plates 6 and 7.

A first reinforcing layer contains a rigid top plate 6 which abuts against the top surface 2 of the first elastomeric block 1.

A second reinforcing layer contains a rigid bottom plate 7 which abuts against the bottom surface 3 of said first elastomeric block 1.

The top plate 6 forms a bottom plate 7' for the second elastomeric block 1' situated on top of the first elastomeric block 1, while the bottom plate 7 forms a top plate 6" for the third elastomeric block 1" situated under the first elastomeric block 1.

The elastomeric blocks 1, 1', 1" are preferably glued onto the adjoining rigid reinforcement plates 6, 7, so that when these elastomeric blocks 1, 1', 1" are pressed together, the loaded top and bottom surfaces will not deform.

The top plate 6 and the bottom plate 7 are each provided with a raised edge 5 which extends beyond the bulging surface 4 of the first elastomeric block 1. In an analogous manner, these reinforcement plates 6, 7, 6" and 7' are each provided with raised edges 5 as well, extending beyond the bulging surfaces 4', 4" of the second and third elastomeric blocks 1', 1".

Figure 3:
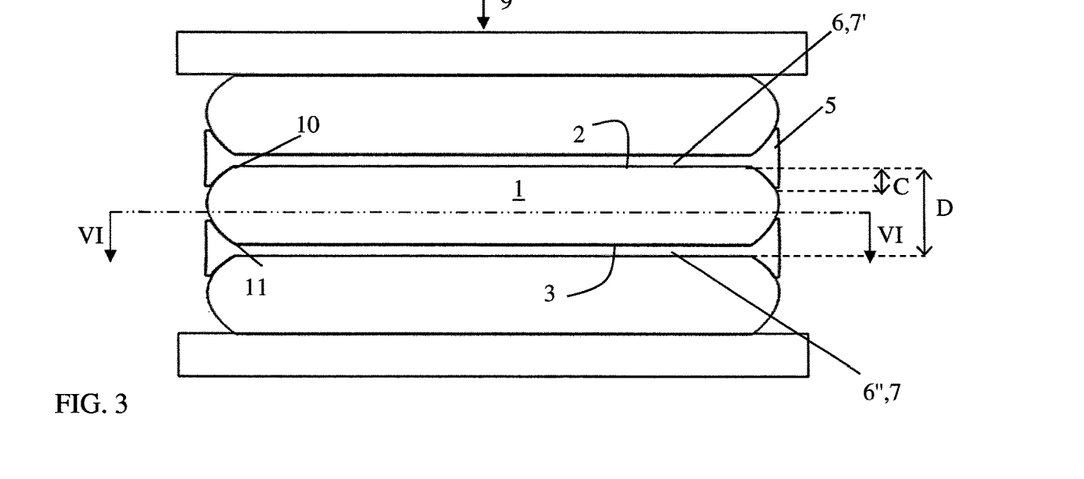
FIG. 3 is a schematic representation as in FIG. 1, wherein the elastomeric blocks of the support are compressed to a minimum height.

The raised edge 5 preferably extends over the bulging surface 4, 4', 4" to an edge height C which is smaller than the compressed height B of the elastomeric block 1, 1', 1". According to this embodiment, the edge height C is smaller than half the compressed height B of the elastomeric block 1, 1', 1" and/or the edge height C is smaller than half the minimum compressed height D of the elastomeric block 1, 1', 1". The minimum height D corresponds to a specific authorised deviation or compression of the elastomeric block 1, 1', 1" caused by the exerted load 9.

Opposite the bulging surfaces 4, 4', 4", the raised edges 5 show a concavely curved surface 8.

When the elastomeric blocks 1, 1', 1" are elastically compressed, the bulging surfaces 4, 4', 4" bulge out, as represented in FIGS. 2, 3, 5 and 6. The greater the load on the elastomeric blocks 1, 1', 1", the further the elastomeric blocks 1, 1', 1" will be compressed and the greater the curvature of the bulging surfaces 4, 4', 4" will be.

Figure 6:
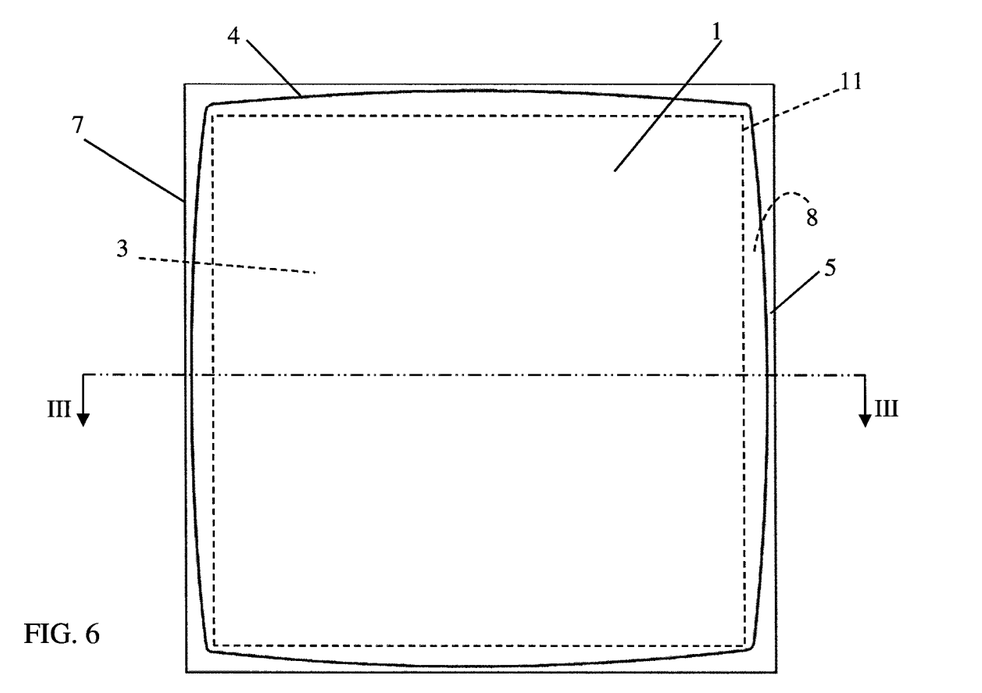
FIG. 6 is a schematic representation of a cross-section of the embodiment of FIG. 3.

When the elastomeric blocks 1, 1', 1" are compressed until the height A between the top surfaces 2, 2', 2" and the bottom surfaces 3, 3', 3" amounts to the minimum height D, the convex surfaces of the bulging surfaces 4, 4', 4" will fit tightly against the concavely curved surfaces 8 of the raised edges 5, as represented in FIGS. 3 and 6.

The curvature of the curved surface 8 of the raised edge 5 is substantially equal to the curvature of the bulging surface 4, 4', 4" of the elastomeric block 1, 1', 1" when this elastomeric block 1, 1', 1" is compressed between the top surface 2, 2', 2" and the bottom surface 3, 3', 3" to the minimum height D within the authorised deviation for the load 9 exerted on the elastomeric block 1, 1', 1" while the bulging surface 4, 4', 4" can freely bulge out.

However, this curvature of the curved 8 surface would be substantially larger than the curvature of the bulging surface 4, 4', 4" of the elastomeric block 1, 1', 1" if it were compressed to a height which is smaller than the minimum height D when exceeding the authorised deviation for the load 9 exerted on the elastomeric block 1, 1', 1" while the bulging surface 4, 4', 4" could freely bulge out.

The support is preferably provided such that the load 9 on the support results in a compressed height B of the elastomeric blocks 1, 1', 1" which is higher than the minimum height D.

A lower separating edge 11 of the elastomeric block 1, 1', 1" forms the separation between the bottom surface 3, 3', 3" and the bulging surface 4, 4', 4" and touches the lower side of the curved surface 8 and/or of the raised edge 5. In the same way, the separation between the top surface 2, 2', 2" and the bulging surface 4, 4', 4" forms an upper separating edge 10.

The separating edges 10, 11 of the elastomeric block 1, 1', 1" are fixed with respect to the top plate 6 or the bottom plate 7. This is because the top surface 2, 2', 2" and the bottom surface 3, 3', 3" of the elastomeric block 1, 1', 1" are glued to the top plate 6 or the bottom plate 7 respectively on the one hand, and the separating edges 10, 11 rest against the lower side of the raised edges 5 of the top plate 6 or the bottom plate 7 respectively on the other hand. Consequently, when the elastomeric blocks 1, 1', 1" are compressed, these separating edges 10, 11 will not move in relation to the top plate 6 or the bottom plate 7 against which said separating edges 10, 11 rest.

As the convex surface of the bulging surface 4, 4', 4" corresponds to the concave surface of the raised edge 5, any possible pressure exerted on the raised edge 5 by the elastomeric block 1, 1', 1" will be equally divided. As a result, the tension created at the bulging surfaces 4, 4', 4" will be at least partly absorbed. The concave shape of the surface of the raised edge 5 also prevents any local tension or incisions occurring which could damage the elastomeric blocks 1, 1', 1".

Thanks to the raised edges 5, any further compression of the elastomeric blocks 1, 1', 1" due to a higher load on the layered support on the one hand, and/or so-called creep in case of a continuous high load on the other hand will be restricted and/or prevented.

Figure 8:
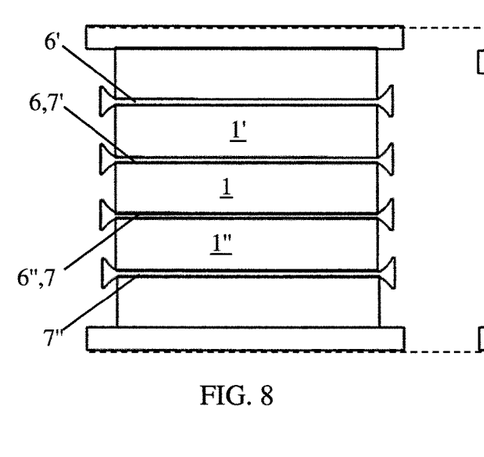
FIG. 8 is a schematic representation of a longitudinal cross-section of a layered support with five elastomeric blocks according to a second embodiment.
Figure 9:
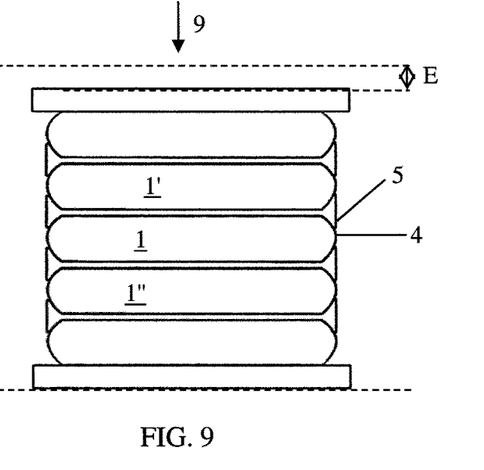
FIG. 9 is a schematic representation as in FIG. 8 wherein the elastomeric blocks of the support are compressed to a minimum height.

A second embodiment of the invention, represented in FIGS. 8 and 9, mainly differs from the first embodiment due to the higher number of consecutive, alternating elastic layers and rigid reinforcing layers. This embodiment counts five elastic layers with elastomeric blocks 1 which are separated from one another by the rigid reinforcement plates 6, 7.

Figure 10:
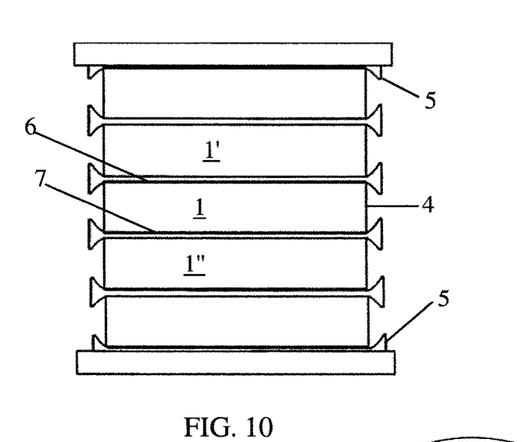
FIG. 10 is a schematic representation of a variant of the second embodiment as in FIG. 8.

A variant of the second embodiment is represented in FIG. 10 and differs in that the support on the top side and the bottom side is a reinforcement plate as well, provided with a raised edge 5.

Figure 11:
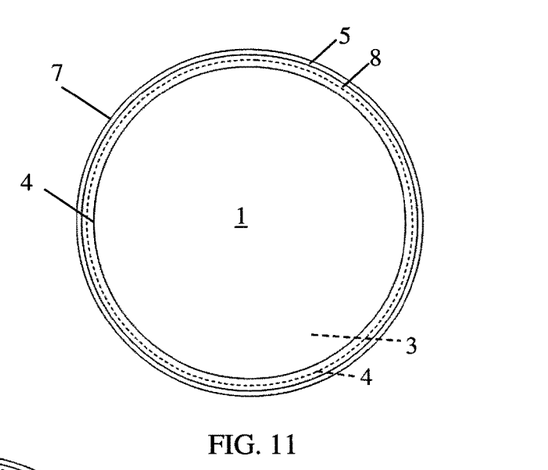
FIG. 11 is a schematic representation of a cross-section of a third embodiment.

A third embodiment of the invention, represented in FIG. 11, differs from the first embodiment in that the elastomeric blocks 1 are disc-shaped and in that the corresponding reinforcement plates 6, 7 are disc-shaped as well.

Figure 12:
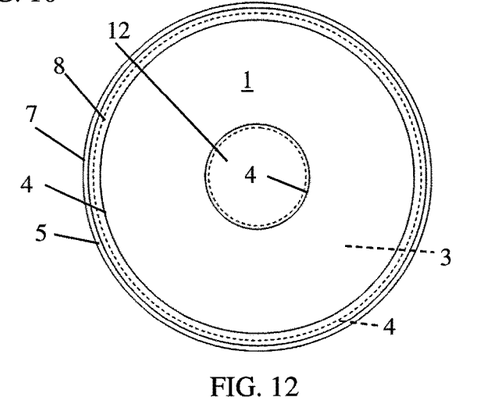
FIG. 12 is a schematic representation of a variant of the third embodiment as in FIG. 11.

A variant of the third embodiment is represented in FIG. 12 and differs in that a recess 12 is centrally provided through the different layers of the support.

According to a variant of the preceding embodiments, not represented in the figures, the raised edge has a surface facing the bulging surface which forms an angle of 15° to 75° with said bulging surface when the elastomeric block is not loaded and the bulging surface consequently does not bulge out. This angle may be constant or it may vary, for example, between an angle of 75° to 25° at the separating edges of the elastomeric block at the lower side of the raised edges and an angle of 25° to 15° at the top side of the raised edge.

According to another variant of the preceding embodiments, not represented in the figures, the bearing surfaces of the elastomeric blocks 1, 1', 1", i.e. the top and bottom surfaces 2, 2', 2", 3, 3', 3", may be provided with textile reinforcements. These textile reinforcements may be attached in the bearing surfaces by means of vulcanisation and they provide increased resistance against deformation. The textile reinforcements may consist of a woven structure extending substantially parallel to the bearing surface. The textile reinforcement preferably extends over the entire surface of the bearing surface or at least over an edge of the bearing surface adjoining the bulging surface. The bearing surfaces provided with the textile reinforcements may be further either or not glued to the top or bottom plate 6 and 7.

According to an embodiment of the method of the invention, the concave shape of the surface 8 of the raised edge 5 is determined in an experimental way. The elastomeric block 1 is thereby glued with its top surface 2 to a first flat, rigid plate and with its bottom surface 3 to a second flat, rigid plate (not represented in the figures). The elastomeric block 1 is elastically compressed between these two flat, rigid plates, whereby the height of the elastomeric block 1 between the top surface 2 and the bottom surface 3 is reduced to the required minimum height D. The top surface 2 and the bottom surface 3 remain fixed in relation to the flat plates, whereas the bulging surface 4 will thereby bulge and form a convex surface. The curvature of this convex surface can be measured in a manner known to a person skilled in the art. The concave surface 8 of the raised edge 5 can then be manufactured on the basis of this measured curvature, so that the convex surface can fit closely to this concave surface 8 of the raised edge 5.

The required minimum height D of the elastomeric block 1 can be determined depending, for example, on the maximum load on the layered support to be provided for, the maximum pressure force on this support and/or the maximum authorised deviation E of the structure resting on the support. Thus, for certain applications, the maximum authorised vertical deviation E of a building structure will be decisive.

According to a variant, instead of using an experimental set-up, the intended shape is obtained on the basis of a calculation and/or simulation, taking into account, among other things, the different pressure forces, tensions and the resulting protrusion.

The reinforcement plates can be made of, for example, iron, cast iron, steel or glass fibre-reinforced polymers, by means of techniques known as such, such as milling, injection moulding, foundry casting and/or other known techniques.

The type and composition of the elastomeric blocks can be selected depending on the required properties and loads of the support. Thus, these blocks may be formed of rubber, polyurethane or other known elastomers.

The elastomeric blocks can be attached to the reinforcement plates by techniques known as such, such as vulcanisation, mechanical clamping and/or gluing with adhesives known as such, such as for example polyurethane glue.

Naturally, the invention is not restricted to the methods described above and the embodiments represented in the accompanying figures. Thus, the different characteristics of these embodiments can be mutually combined.

The invention claimed is:

1. A layered support supporting a building structure alternately comprising one or several elastomeric layers and one or several reinforcing layers,
    wherein at least one elastomeric layer comprises an elastically compressible elastomeric block with a top surface and a bottom surface situated opposite each other and with at least one bulging surface in between them,
    wherein the elastomeric block has a height amounting to the distance between the top surface and the bottom surface,
    wherein the bulging surface of the elastomeric block bulges out elastically in a free space when the elastomeric block is compressed between its top surface and its bottom surface by a load of the building structure, such that the height of the elastomeric block amounts to a compressed height,
    wherein at least a first reinforcing layer comprises a rigid top plate which abuts against the top surface of the elastomeric block and at least a second reinforcing layer comprises a rigid bottom plate which abuts against the bottom surface of the elastomeric block,
    wherein at least the top plate and/or the bottom plate are/is provided with a raised edge,
    wherein the raised edge has a surface extending at least partly opposite the bulging surface, and
    wherein the bulging surface bulges out elastically in the free space until the bulging surface abuts at least partly against said surface of the raised edge when the elastomeric block is compressed between the top surface and the bottom surface and the height is decreased to a minimum height.

2. The layered support according to claim 1, wherein the surface of the raised edge which extends opposite the bulging surface is concavely curved.

3. The layered support according to claim 2, wherein curvature of the curved surface of the raised edge is substantially equal to curvature of the bulging surface of the elastomeric block when this elastomeric block is compressed between the top surface and the bottom surface and the height amounts to the minimum height with an authorized deviation for the load exerted on the elastomeric block while the bulging surface can freely bulge out.

4. The layered support according to claim 1, wherein the raised edge extends to an edge height which is smaller than the compressed height of the elastomeric block.

5. The layered support according to claim 1, wherein the bulging surface extends over the entire circumference of the elastomeric block.

6. The layered support according to claim 1, wherein the raised edge extends over the entire circumference of the elastomeric block, the top plate and/or the bottom plate.

7. The layered support according to claim 1, wherein it comprises several alternating layers of elastomeric blocks and reinforcement plates, wherein the top plate of the elastomeric block forms the bottom plate of an elastomeric block situated on top of the latter and the bottom plate of the elastomeric block forms the top plate of an elastomeric block situated under the latter.

8. The layered support according to claim 1, wherein the top surface and/or the bottom surface of the elastomeric block are/is provided with a textile reinforcement.

9. A method to restrict the compression of a layered elastomeric support supporting a building structure alternately comprising one or several elastomeric layers and one or several reinforcing layers,
    wherein at least one elastomeric layer comprises an elastically compressible elastomeric block with a top surface and a bottom surface situated opposite each other and with at least one bulging surface in between them,
    wherein the elastomeric block has a height amounting to the distance between the top surface and the bottom surface,
    wherein the bulging surface of the elastomeric block bulges out elastically in a free space when the elastomeric block is compressed between the top surface and the bottom surface by a load of the building structure, such that the height of the elastomeric block amounts to a compressed height,
    wherein at least a first reinforcing layer comprises a rigid top plate which abuts against the top surface of the elastomeric block and at least a second reinforcing layer comprises a rigid bottom plate which abuts against the bottom surface of the elastomeric block,
    wherein at least one of the top plate and the bottom plate is provided with a raised edge, wherein the raised edge has a surface extending at least partly opposite the bulging surface,
    wherein elastic compression of the elastomeric block is restricted by making the bulging surface of the elastomeric block that bulges out elastically in the free space, rest at least partly against the raised edge when a specific elastic compression of the elastomeric block is exceeded.

10. The method according to claim 9, wherein the bulging surface is made to rest at least partly against a concavely curved surface of a raised edge.

11. The method according to claim 10, wherein curvature of the concavely curved surface is made to correspond with curvature of the surface of the bulging surface of the elastomeric block when it is subjected to the specific elastic compression while bulging of the bulging surface is not being hindered.

12. The method according to claim 11, wherein the bulging surface of the elastomeric block is made to rest, over the entire circumference of the elastomeric block, against the concavely curved surface when the elastomeric block is subjected to the specific elastic compression.

13. The method according to claim 9, wherein the elastomeric block is compressed between a top surface and a bottom surface, so that the bulging surface is made to bulge out between these surfaces.

14. The method according to claim 13, wherein the top surface and the bottom surface are fixed to a rigid plate.

15. A method for manufacturing a layered support for supporting a building structure which alternately comprises one or several elastomeric layers and one or several reinforcing layers, wherein at least one elastomeric layer comprises an elastically compressible elastomeric block with a top surface and a bottom surface situated opposite each other and with at least one bulging surface in between them, wherein the elastomeric block has a height amounting to the distance between the top surface and the bottom surface, wherein the bulging surface of the elastomeric block bulges out elastically in a free space when the elastomeric block is compressed between its top surface and its bottom surface by a load of the building structure, such that the height of the elastomeric block amounts to a compressed height, wherein at least a first reinforcing layer comprises a rigid top plate which abuts against the top surface of the elastomeric block and at least a second reinforcing layer comprises a rigid bottom plate which abuts against the bottom surface of the elastomeric block, wherein at least the top plate and/or the bottom plate are/is provided with a raised edge, wherein the raised edge has a surface extending at least partly opposite the bulging surface and wherein the bulging surface bulges out elastically in the free space until the bulging surface abuts at least partly against said surface of the raised edge when the elastomeric block is compressed between the top surface and the bottom surface and the height is decreased to a minimum height, and providing the raised edges with a curved surface opposite the bulging surface, and forming a curvature of the curved surface of the raised edges so as to correspond with curvature of the surface of the bulging surface in the free space when the elastomeric block is compressed to a certain height.

16. The method according to claim 15, further comprising forming a concavely curved surface of the raised edge in such a way as to correspond with at least a part of a convex surface of the bulging surface of the elastomeric block when the elastomeric block is compressed to a certain height between the top surface and the bottom surface and the top surface and the bottom surface are prevented from being deformed.

17. The method according to claim 16, further comprising fixing each of the top surface and the bottom surface to a rigid plate so as to prevent the top surface and the bottom surface from being deformed.

18. The method according to claim 9, further comprising providing the top surface and/or the bottom surface of the elastomeric block with a textile reinforcement.

19. The method according to claim 15, further comprising providing the top surface and/or the bottom surface of the elastomeric block with a textile reinforcement.

20. The layered support according to claim 1, wherein the raised edge extends to an edge height which is smaller than the minimum height of the elastomeric block.

* * * * *